May 30, 1950      M. J. MATTHEYSES      2,509,239
BATTERY CHARGING SYSTEM
Filed Sept. 1, 1945
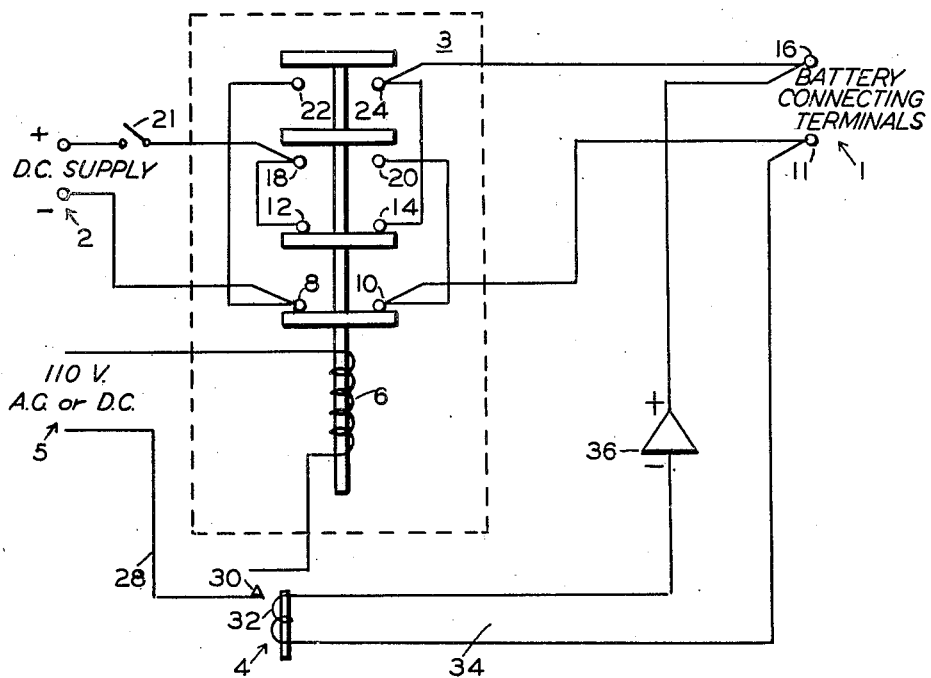
INVENTOR
MARCEL J. MATTHEYSES
BY
ATTORNEY Patented May 30, 1950

2,509,239

UNITED STATES PATENT OFFICE 2,509,239

BATTERY-CHARGING SYSTEM

Marcel J. Mattheyses, New York, N. Y., assignor to Federal Telephone and Radio Corporation, New York, N. Y., a corporation of Delaware Application September 1, 1945, Serial No. 613,977

8 Claims. (Cl. 320—26)

The present invention relates to storage battery charging systems and is more particularly concerned with an arrangement for assuring in such a system that the charging current is supplied to the storage battery at proper polarity.

Storage batteries are recharged by passing a direct current through the battery in a direction opposite to that in which the current flows when the battery is in use for supplying electrical energy. It is important that the charging current flow in the proper direction, for the battery would only be further discharged and would quickly be permanently damaged, by passage of current through it in the wrong direction.

Storage battery charging units, for charging one or a few batteries at a time, are in wide general use, such as in garages, filling stations, and elsewhere. Under these circumstances it frequently happens that the charging is performed by relatively unskilled or careless operators with the consequent hazard that a battery may be inadvertently connected to the charger terminals with reversed polarity.

It is the object of the present invention to provide a storage battery charging system which will supply current at the right polarity to the storage battery whether the battery is connected to the charger terminals in the correct polarity or not.

A further object of the invention is to provide a simple reliable storage battery charging system having few moving parts and which will assure application of charging voltage to the battery connecting terminals at the proper polarity for charging a battery connected thereto, irrespective of the polarity of the connection between the charger terminals and the battery terminals.

The system of the present invention comprises, in general, a direct current source which is connected to the battery connecting terminals through an intermediate means, responsive to the relative potential of the terminals, which will operate to reverse the connection between the source and the battery connecting terminals if the battery is connected to the terminals in the wrong polarity. The system includes a multi-contact magnetic contactor whose contacts connect the direct current source to the battery connecting terminals. The contactor has a plurality of normally-open contacts and a plurality of normally-closed contacts which are so connected to the direct current source and to the battery connecting terminals that the terminals are connected to the direct current source in one polarity when the contactor is in its normal condition and in the opposite polarity when the contactor is operated. The contactor is arranged to be operated by a relay which is connected to the battery connecting terminals so that it responds, to operate the contactor, when the battery is incorrectly connected. When the contactor is operated it serves to reverse the polarity of the connection between the direct current source and the battery connecting terminals. The relay circuit for controlling the contactor includes a rectifier which permits current flow to the relay operating winding when the battery is improperly connected but opposes free current flow when the battery is properly connected.

The invention will be better understood from the following description of a preferred embodiment of the invention illustrated in the accompanying drawing, in which the single figure shows diagrammatically a storage battery charging system embodying the invention.

Referring to the drawing, the battery charging system comprises a set of battery connecting terminals 1, to which a storage battery to be charged may be connected, and a direct current supply 2, of suitable voltage, which furnishes energy for charging a storage battery connected to the terminals 1. The direct current supply 2 is connected to the set of battery connecting terminals 1 through a magnetic contactor 3 which in normal position connects the direct current supply 2 to the battery connecting terminals 1 in one polarity and in its other operated position supplies current to the set of terminals 1 in the opposite polarity. The operation of the magnetic contactor 3 is under the control of a relay 4. The relay 4 will respond to connect the operating winding of the contactor 3 to a suitable source of electromotive force 5 if a storage battery is connected to the terminals 1 in the wrong polarity to be charged when the terminals 1 are at the polarity corresponding to the normal position of the contactor 3. If the storage battery is properly connected for the polarity of terminals 1 corresponding to the normal position of the contactor 3, the relay 4 does not respond.

The magnetic contactor 3 is provided with an operating winding 6 and four pairs of contacts. A pair of normally-closed contacts is indicated at 8 and 10. The contact 8 is connected to the negative side of the direct current supply 2 and the contact 10 is connected to the terminal 11 of the set of battery connecting terminals 1. A second pair of normally-closed contacts 12 and 14 is provided in the magnetic contactor 3. The contact 12 is connected to the positive side of the direct current supply 2 through a switch 21, as shown, and the contact 14 is connected to the terminal 16 of the set of battery connecting terminals 1. A pair of normally-open contacts 18 and 20 is also provided in the magnetic contactor and arranged to be interconnected upon operation of the contactor. The contact 18 is connected to the positive side of the direct current supply 2 through a switch 21 and is also connected to the contact 12. The contact 20 is connected to the contact 10 and therethrough to the terminal 11 of the set of battery connecting terminals 1. A second pair of normally-open contacts 22 and 24 are arranged to be interconnected upon operation of the magnetic contactor. The contact 22 is connected to the contact 8 and therethrough to the negative side of the direct current supply 2, and the contact 24 is connected to the contact 14 and also to the terminal 16 of the set of battery connecting terminals 1.

It will thus be seen that the magnetic contactor 3 in its normal position, shown in the drawing, connects the negative side of the direct current supply 2 to battery connecting terminal 11, and connects the positive side of the direct current supply to the battery connecting terminal 16. The magnetic contactor 3 is biased toward its normal position, illustrated in the drawing, in any suitable manner as is well understood in the art. The magnetic contactor returns to this normal position when its operating winding 6 is de-energized and remains in normal position until the operating winding 6 is again energized. It will be understood that when the magnetic contactor 3 is in normal position the normally closed contacts of each pair, 8—10, and 12—14, are electrically interconnected and the normally open contacts, 18—20 and 22—24 are disconnected. When the magnetic contactor 3 is operated by energization of its operating winding 6, contacts 8 and 10 are disconnected, as are contacts 12 and 14. In this operated position of the contactor, contact 18 is connected with contact 20 and contact 22 with contact 24.

The operating winding 6 of the contactor is connected as shown to a suitable source of electromotive force 5 through a circuit 28 which includes the normally open contacts 30 of relay 4. The operating winding 32 of the relay 4 is connected across the battery connecting terminals 11 and 16 by a circuit 34 and a rectifier 36 is connected, in series with winding 32, in this same circuit 34. The rectifier 36 may be of any suitable type and is so connected as to oppose flow of current through circuit 34 when no battery is connected to terminals 11 and 16 or when a battery is connected to these terminals with its positive terminal connected to terminal 16 and its negative terminal connected to terminal 11.

The operation of the storage battery charging system described above is as follows:

The storage battery which it is desired to charge is connected to the battery connecting terminals 1 in any conventional manner such as by the use of flexible leads which connect one terminal of the battery to terminal 16 and the other terminal of the battery to terminal 11. If the positive terminal of the battery is connected to terminal 16, insufficient current will flow in circuit 34, due to the presence of the rectifier 36, to energize the operating winding 32 of the magnetic contactor controlling relay 4. The contactor 3 will thus remain in its normal position, illustrated in the drawing. In this position the terminal 16 is connected through the normally closed contacts 12 and 14 to the positive side of the direct current supply 2, and the terminal 11 is connected, through the normally-closed contacts 8 and 10, to the negative side of the direct current supply. The storage battery is thus connected to terminals 11 and 16 in the proper polarity for charging the battery from the direct current supply 2. Upon closing of switch 21, current will flow through the battery from the supply 2 to charge the same.

If the storage battery should be connected to the battery connecting terminals 1 in the opposite polarity, that is, with the positive terminal of the battery connected to the terminal 11 and the negative terminal of the battery connected to the terminal 16, the rectifier 36 will then permit current to flow in circuit 34. The current in circuit 34 will energize the operating winding 32 of the relay 4 to cause the normally-open relay contacts 30 to be closed, thus establishing the circuit from the source of electromotive force 5 to the operating winding 6 of the magnetic contactor 3. The consequent energization of operating winding 6 of the contactor 3 will operate the magnetic contactor 3 from its normal position shown in the drawing and into position to open the normally-closed pairs of contacts 8—10, 12—14, and to close the normally-open pairs of contacts 18—20 and 22—24. In this operated condition the magnetic contactor 3 will connect the terminal 11, through contacts 20 and 18, to the positive side of the direct current supply 2 when switch 21 is closed and connect the terminal 16, through contacts 24 and 22, to the negative side of the direct current supply. The proper polarity is thus established at the terminals 11 and 16 to charge the battery connected thereto, since in this case the positive terminal of the battery has been assumed to be connected to the terminal 11. The switch 21 may then be closed to charge the battery.

It will be appreciated that in normal operation the switch 21 will be left open until after the battery terminals have been connected to the terminals 11 and 16. When the battery terminals have been connected to the terminals 11 and 16, the contactor 3 will be operated, if necessary, to establish a connection of proper polarity between the terminals 11 and 16 and the direct current supply before the switch 21 is closed to supply charging current to the battery. The battery thus will not be subjected, even momentarily, to discharging through the battery charging system. However, if the switch 21 is closed at the time the battery is connected to terminals 11 and 16, the contactor 3 will nevertheless operate immediately, if necessary, to reverse the connection between the supply 2 and the terminals 11 and 16.

It will be seen from the foregoing description of the battery charging system of the present invention that a system is provided in which the battery may be connected to the charger terminals with polarity at random without damaging the battery, and that the system of the present invention will establish a proper polarity at the battery connecting terminals, reversing the normal polarity of the terminals if necessary, so that the battery will be charged by a current flowing in the proper direction irrespective of the polarity in which the battery is connected to the charger terminals.

Although a particular preferred embodiment of the present invention has been described in detail, this detailed disclosure is made by way of illustration and not of limitation, and those skilled in the art will appreciate that the invention is not restricted to the details shown but comprises the novel features pointed out in the following claims.

I claim:

1. A storage battery charging system including, in combination, a direct current source, a pair of battery connecting terminals to which a storage battery may be connected in random polarity for charging it from said direct current source, a circuit forming an electrical connection between said source of direct current and said terminals and means including a rectifier and a relay serially connected in said circuit for reversing the polarity of said connection when a storage battery is connected to said terminals in improper polarity for charging the battery.

2. A storage battery charging system including, in combination, a direct current source, a pair of battery connecting terminals to which a storage battery may be connected in random polarity for charging said battery from said source, and a contactor having contacts establishing a connection between said terminals and said source in a predetermined polarity and operable to reverse the polarity of said connection, and means including a rectifier and a relay serially for operating said contactor when a storage battery is connected to said terminals in improper polarity for charging the battery.

3. A storage battery charging system including, in combination, a direct current source, a pair of battery connecting terminals to which a storage battery may be connected in random polarity for charging said battery from said direct current source, a contactor having contacts establishing a connection between said terminals and said source in predetermined polarity and operable to reverse the polarity of said connection, and a relay and rectifier serially connected to said terminals for operating said contactor when a storage battery is connected to said terminals in improper polarity for charging the battery.

4. A storage battery charging system including, in combination, a direct current source, a pair of battery connecting terminals to which a storage battery may be connected in random polarity for charging said battery from said source, a contactor having contacts establishing a connection between said terminals and said source in a predetermined polarity and operable to reverse the polarity of said connection, a relay connected to said terminals for operating said contactor, and a rectifier connected in series with said relay and said terminals for preventing said relay from responding when a battery is correctly connected to said terminals.

5. A storage battery charging system including, in combination, a direct current source, a pair of battery connecting terminals to which a storage battery may be connected in random polarity for charging said battery from said source, a contactor having normally-closed contacts forming an electrical connection between said source and said terminals of predetermined polarity and normally-open contacts connected to said source and to said terminals to form, when closed, an electrical connection between the source and the terminals of the opposite polarity, said contactor being operable to open the normally-closed contacts and close the normally-open contacts, and means including a rectifier and a relay serially connected to said terminals for operating said contactor when a storage battery is connected to said terminals in improper polarity for charging the battery from said source.

6. A storage battery charging system including, in combination, a direct current source, a pair of battery connecting terminals to which a storage battery may be connected in random polarity for charging said battery from said source, a contactor having normally-closed contacts forming an electrical connection between said source and said terminals of predetermined polarity and normally-open contacts connected to said source and to said terminals to form, when closed, an electrical connection between the source and the terminals of the opposite polarity, said contactor being operable to open the normally-closed contacts and close the normally-open contacts, and a relay and rectifier serially connected to said terminals for operating said contactor when a storage battery is connected to said terminals in improper polarity for charging the battery from said source.

7. A storage battery charging system including, in combination, a direct current source, a pair of battery connecting terminals to which a storage battery may be connected in random polarity for charging said battery from said source, a contactor having normally-closed contacts forming an electrical connection between said source and said terminals of predetermined polarity and normally-open contacts connected to said source and to said terminals to form, when closed, an electrical connection between the source and the terminals of the opposite polarity, said contactor being operable to open the normally closed contacts and close the normally-open contacts, a relay connected to said terminals for operating said contactor, and a rectifier connected in series with said relay and said terminals for preventing said relay from responding when a battery is connected to said terminals in proper polarity for charging the battery from said source.

8. A storage battery charging circuit including, in combination, a direct current source, a pair of battery connecting terminals comprising a first terminal and a second terminal, a magnetic contactor for connecting said terminals to said direct current source comprising a pair of normally-closed contacts connecting the negative side of the direct current source to said first terminal, a second pair of normally-closed contacts connecting the positive side of said direct current source to said second terminal, a pair of normally-open contacts one of which is connected to the positive side of said direct current source and the other of which is connected to said first terminal, a second pair of normally-open contacts one of which is connected to the negative side of said source of direct current and the other of which is connected to the second terminal, said magnetic contactor being biased into a normal condition in which said normally-open contacts are open and said normally-closed contacts are closed, and being operable to open said normally-closed contacts and to close said normally-open contacts, an operating winding for operating the magnetic contactor, a source of electromotive force, a relay having a set of normally-open contacts connected to connect said source of electromotive force to said operating winding when closed, a relay-operating winding connected across said terminals, and a rectifier connected in series with said relay operating winding and said terminals to permit current flow through said relay-operating winding when a storage battery is connected across said terminals with its positive terminal connected to said first terminal, whereby said magnetic contactor connects said first terminal to the negative side of said source of direct current and said second terminal to the positive side of said source of direct current when a storage battery is connected with its positive terminal to said second terminal and its negative terminal to said first terminal, and the relay responds, when a battery is connected to said terminals with its positive terminal connected to said first terminal and its negative terminal connected to said second terminal, to operate the magnetic contactor to reverse the connections of said terminals to said direct current source.

MARCEL J. MATTHEYSES.

REFERENCES CITED

The following references are of record in the file of this patent:

UNITED STATES PATENTS

| Number | Name | Date |
| --- | --- | --- |
| 508,069 | Whiting | Nov. 7, 1893 |
| 516,498 | Lewis | Mar. 13, 1894 |
| 669,940 | Gilbert et al. | Mar. 12, 1901 |
| 719,753 | Creveling | Feb. 3, 1903 |
| 991,106 | Turbayne | May 2, 1911 |